United States Patent
Gennetten et al.

(10) Patent No.: US 7,119,835 B2
(45) Date of Patent: Oct. 10, 2006

(54) CAMERA DOCKING SOLUTION PROVIDES A USER INTERFACE FOR PRINTERS, CD WRITERS AND OTHER DEVICES

(75) Inventors: K Douglas Gennetten, Ft Collins, CO (US); Amy E Battles, Windsor, CO (US); James C Dow, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 604 days.

(21) Appl. No.: 09/871,320

(22) Filed: May 30, 2001

(65) Prior Publication Data
US 2004/0201680 A1 Oct. 14, 2004

(51) Int. Cl.
*H04N 5/225* (2006.01)
*G03B 17/00* (2006.01)
*G03B 29/00* (2006.01)

(52) U.S. Cl. .............. 348/207.2; 348/211.1; 396/429; 396/300

(58) Field of Classification Search ........... 348/211.1, 348/211.3, 211.4, 207.99, 207.1, 207.2, 14.1, 348/384.1; 396/429, 300; 358/1.15
See application file for complete search history.

(56) References Cited

U.S. PATENT DOCUMENTS

| | | | | |
|---|---|---|---|---|
| 4,901,160 A | * | 2/1990 | Kinoshita et al. | 386/118 |
| 4,937,676 A | * | 6/1990 | Finelli et al. | 348/375 |
| 4,984,084 A | * | 1/1991 | Sasaki et al. | 348/376 |
| 5,264,935 A | * | 11/1993 | Nakajima | 348/705 |
| 5,296,315 A | * | 3/1994 | Rein | 429/100 |
| 5,612,732 A | * | 3/1997 | Yuyama et al. | 348/14.01 |
| 5,644,410 A | * | 7/1997 | Suzuki et al. | 358/471 |
| 5,666,159 A | * | 9/1997 | Parulski et al. | 348/211.2 |
| 5,715,234 A | * | 2/1998 | Stephenson et al. | 396/429 |
| 5,822,637 A | * | 10/1998 | Stephenson | 396/429 |
| 5,893,037 A | * | 4/1999 | Reele et al. | 455/556.1 |
| 6,219,560 B1 | * | 4/2001 | Erkkila et al. | 455/557 |
| 6,449,438 B1 | * | 9/2002 | Gennetten | 396/300 |
| 2003/0007169 A1 | * | 1/2003 | Tanaka et al. | 358/1.15 |

* cited by examiner

Primary Examiner—Lin Ye

(57) ABSTRACT

A camera mount includes a hosting device including a flat surface for mounting a camera including a user interface. A first connector is located on the flat surface such that the first connector mates to a complementary connector located on the camera. The user interface of the camera also functions as the user interface of the hosting device.

14 Claims, 3 Drawing Sheets

CAMERA DOCKING SOLUTION PROVIDES A USER INTERFACE FOR PRINTERS, CD WRITERS AND OTHER DEVICES

BACKGROUND OF THE INVENTION

1. Field of the Invention

This invention relates generally to digital cameras and more particularly to docked digital camera that becomes a user interface (UI) for a hosting device.

2. Description of Related Art

A digital camera records and stores photographic images in digital form that can be fed to a personal computer (PC) as the impressions are recorded or stored in the camera for later loading into the PC. Generally, a number of cables must be plugged into or unplugged from the camera when transferring photos from the camera to the PC, charging batteries located within the camera, or connecting an AC power source to the camera.

It is well-known to mount both conventional and digital cameras on a camera tripod and/or other similar well-known camera mount. Conventional camera mounts include a threaded screw on a mounting surface. Conventional and digital cameras include an industry standard threaded mounting hole located on a bottom surface of the camera. The threads of the mounting hole match the threads of the screw on the mounting surface of the camera mount.

Digital cameras may also include a liquid crystal display (LCD) built into the camera that conveys information to a user with respect to the operation of the camera, such as how many more images are capable of being taken and stored by the camera. Other digital cameras include an LCD built into the back of the camera capable of displaying, in color, the images recorded and stored in the camera. The LCD screen may also be used as a viewfinder and allows a user to see what a picture will look like before it is taken. The LCD also allows a user to look at photos already taken and stored within the camera.

Digital cameras use solid-state memory flash cards to store images. These flash cards are typically nonremovable memory chips embedded within the camera. More commonly, digital cameras store photos on a removable card that is used to transfer files to the computer. These cards, which can range in size from 4 to 256 MB, come in two primary configurations—CompactFlash and SmartMedia. Additionally, some newer cameras accept the CompactFlash drives, which provides up to 1 GB of storage space for data. However, a card reader or adapter is required to read files into the PC which must be connected to the PC's small computer systems interface (SCSI) or USB (universal serial bus) port if a card slot is not built into the PC. Smart Media cards store a maximum of 64 megabytes, but they easily download on a reader that connects to the PC's floppy disk drive. Once the card is placed in the reader, the PC's transfer software is launched to transfer the photos from the camera. The camera is connected to the PC in order to transfer photos from the camera to the PC. Some digital cameras can output photos directly to a floppy disk or via cable to a PC.

Digital cameras consume a great deal of battery power. Many digital cameras can be plugged in for stationary use, and some run off external battery packs. When a digital camera is connected, or docked, to a PC, its color display is generally turned off and unusable. When a digital camera is un-docked, its LCD display consumes too much power to be left on for any length of time. When the digital camera is in use, it is suggested that the camera's LCD display be turned off to conserve battery power for taking and storing photo images.

Once images are transferred from the digital camera to the PC, they may be printed into a hard copy using a color printer. The software for the camera allows the images to be viewed on the PC. Images may be saved to a floppy disk or the hard drive. Images can be saved in a specific graphic file format, e.g., gif or jpg for Web publishing, pcx or bmp for paper publishing. A graphics program, such as Paint Shop Pro, may be used to edit the images. Once loaded into the PC, the images may be transferred or "burned" to a Compact Disk (CD) using a CD Writer.

However, many steps are involved in transferring images from a digital camera to the PC. This process is further complicated by the fact that in order to print the images or transfer the images to a CD, the images must first be transferred to a PC. In order to transfer images from the digital camera to the PC, it is necessary to hook the camera up to the PC using various cables. If digital photos are taken using a tripod or other mounting surface, it is first necessary to detach the camera from the surface in order to connect the camera to cables from the PC. This is a time-consuming and inefficient process. Additionally, as stated above, the LCD of a digital camera is a heavy drain on the camera's batteries. If a user wishes to use the LCD of the digital camera while the camera is in use, the drain on the batteries limits the number of photos the camera may take during use. Also, if a user is taking digital photos using a tripod or other camera mount, the user may be in a location away from the user's PC. Even if a user were to download digital photos to a portable notebook computer, the user must still disconnect the digital camera from the camera mount to connect the camera to the notebook computer.

In information technology, a user interface (UI) is everything designed into an information device with which a human being may interact—including display screen, keyboard, mouse, light pen, the appearance of a desktop, illuminated characters, help messages, and how an application program or a Web site invites interaction and responds to it. Devices attached to a PC or notebook (for example, Printers or CD Writers) tend to have very limited UIs which may include an online/offline button or a graphical message on an LCD (for example, a "paper jam" or "out of paper" message). These attached devices primarily depend on the UI of a PC or notebook computer for instructions with respect to which operation to execute (for example, print an image or copy a particular image to a CD). The attempt to print images taken by a digital camera, or transfer images from the digital camera to a CD via CD-writer, results in a tangle of cables and devices where, at a minimum, the digital camera must be connected to the PC which is itself connected to the Photoprinter, CD-writer or similar device that uses images taken by the digital camera. A need exists for a simplified method of downloading and using images taken by a digital camera.

SUMMARY OF THE INVENTION

In accordance with this invention, a camera mount includes a hosting device which has a flat surface for mounting a camera where the camera has a user interface. A first connector is located on the flat surface where the first connector mates to a complementary connector located on the camera. The user interface of the camera also functions as the user interface of the hosting device.

This invention will be more fully understood in light of the following detailed description taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1A:
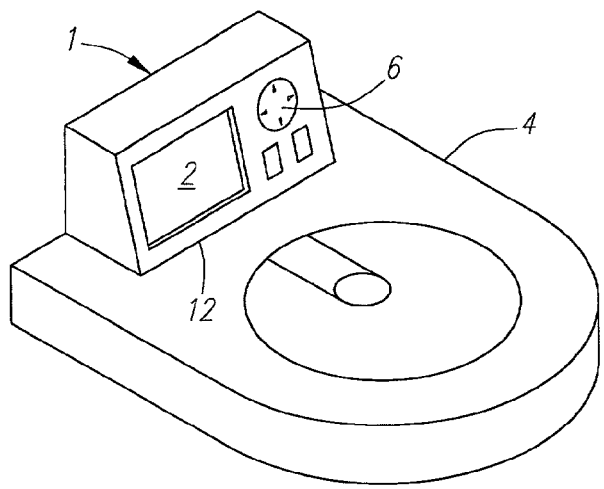
FIG. 1A illustrates an orthogonal view of a digital camera mounted to a CD Writer.

A UI solution for Printers, CD Writers and other devices using or processing digital images provides the aforementioned devices with greater independence from PC and notebook computers and digital cameras by eliminating the need for computer-based power and data connections when printing or transferring digital images. This solution revolves around PC-free saving, sharing and printing of photos from a digital camera. Users need a quick and easy way to "change film" in their digital cameras. Usually, their camera becomes full several times before they have time to do something with the accumulation of photos. This invention provides a convenient PC-free solution for unloading and printing photos. In accordance with an embodiment of this invention, this illustrative camera dock provides data and power connections to a digital camera using existing interfaces on the camera. In accordance with another embodiment of this invention, this illustrative camera dock provides data and power connections within the confines of the industry screw mount standard. The UIs of digital cameras are increasing in functionality to the point where the cameras are reaching the functionality of present-day personal digital assistants (PDA). Camera LCDs are reaching computer-screen quality and starting to employ touch-screen capabilities. While more limited than the UI of a PC or notebook computer, the UI of a digital camera provides greater functionality than the limited UIs found in conventional Printers, CD Writers and other devices using digital images.

A digital camera that doubles as a UI for Printers, CD Writers and other devices using digital images allows digital images to be displayed, printed or transferred to a CD with greater independence from PC and notebook computers. A camera docking solution transforming the camera into a UI for Printers, CD Writers and other devices using digital images includes a camera docking interface that does not interfere with important controls and surfaces of existing or future camera designs of digital cameras. This illustrative docking solution does not require the addition of interfaces to the exterior of a digital camera and may be used in a variety of digital camera docking situations including, without limitation, camera tripods, photo printers, CD-writers, and docking stations. As stated above, conventional photoprinters and CD-writers require a number of additional accessories and support services simply in order to perform their functions.

The digital camera makes a physical and electrical connection to the destination or hosting device. This device could be a CD-writer, a photoprinter, or any other device which consumes photos in digital form. In the case of the CD-writer, the camera would dock "backwards" to the CD-writer so that the camera's image LCD and associated buttons are made accessible. Upon docking to the CD-writer, the camera becomes powered via the dock. The camera senses this new state and presents a modified UI on its image LCD. This modified UI would first show the progress of any pre-configured or default tasks. For example, two automatic default tasks might include "copy-to-CD" and "delete-from-camera". Once the pre-determined automated tasks are done, the UI would provide additional visual navigation functionality for the CD-writer. The user could easily review all photos currently on the CD-ROM and perform management tasks such as "move" and "delete". The modified UI could also be set into a "slide show" mode where it automatically circulates through all or part of the CD-ROM contents. The camera can be undocked at any time. The camera processor would record the status of any tasks active at the time of undocking and any uncompleted automatic tasks would be postponed until the next dock event. Upon undocking, the camera immediately reverts to its normal camera behavior.

In the case of the printer, all of the above is the same with an exception: the automated task would be printing photos on the camera. After the automation is complete, the camera UI would become an extended UI for the printer. As stated above, printers and CD Writers tend to have limited UI's and could benefit from the advantages found in a digital camera UI. While more limited than the UI of a PC or notebook computer, the UI of a digital camera provides greater functionality than the limited UI's found in conventional printers and CD Writers. The digital camera UI, when controlled by a printer or storage device, enables previewing images prior to printing them or storing them.

In accordance with an embodiment of the invention, a camera dock is provided that is integrated into a hosting device. This hosting device could be, without limitation, a photo printer, a CD Writer, or any other small device requiring an image data source. The dock provides power for the camera and the camera's battery recharge cycle. The dock also provides a data connection to transfer images to and from the camera. These images could be directly transferred to the hosting device or, if PC-connected, to the PC's hard drive. The dock enables the device to "hijack" the UI of the digital camera such that the camera undergoes a change in mode from functioning as a digital camera to functioning as a UI for the device. The camera is docked such that the camera's image LCD and controls are readily accessible to a user. The camera may be positioned in the device slightly tilted back for ease of use and access to the controls of the camera.

When the camera is connected to the device, the camera becomes a UI for the hosting device. For a photo printer, this provides visual feedback for reviewing and selecting images for printing or adjustment. For a storage device, the camera UI provides a visual image browser for images already stored on the device, greatly increasing its value as a photo archiving mechanism. The trend toward larger displays and touch-screen support will further enhance the value of this invention.

When the camera is docked to the hosting device, if no action is taken within a certain amount of time, the processor of the camera puts the camera into a power down mode. A software configuration utility gives pre-set default instructions to the camera (e.g., the camera could cycle through the images stored within the camera's processor and display them on the LCD like an electronic picture frame (EPF) or if the camera is docked to a CD-writer, the camera could download the images stored on a CD in the CD-writer and display them on the camera's LCD). Each CD has an identifier. The archive destination for the camera would compare its list of stored identifiers against the identifier on a particular CD and identify to the camera that the CD in the CD-writer has been used before by that camera. If the CD is unknown to the camera, then the UI on the image LCD would prompt the user "Can I download to this disk?" The camera is pre-configured to automatically initiate a process (i.e., autosynchronization: digital camera to send information).

The camera differentiates between the various devices that may serve as a hosting device by identifying each device upon docking. When the camera is docked to the hosting device, the device identifies itself to the camera via an ID code transmitted by the processor of the device to the processor of the camera. When the camera is docked, an electrical connection is formed between the camera and the device. This electrical connection initiates the mode change within the camera from normal camera functions to functioning as the UI of the device the camera is docked to. The camera queries the hosting device; part of which is an I.D. exchange. Once the I.D. exchange has occurred, the processor within the camera matches the I.D. with data in the memory of the camera. This data provides the camera with information regarding the capabilities of the hosting device (e.g., the camera can send images to the device or display images from the device). The dock provides sufficient information to the camera so that when the processor of the camera sends photos in digital form, the camera's UI functions are appropriate towards treating the dock as a disk drive, a printer or other host device. The camera serves as a USB host as if the camera was a computer. Whether the hosting device is connected to a digital camera, PC, or notebook computer, the functionality is the same from the perspective of the CD-writer, printer or other host device. For example, inside the printer, there is a queue where a request has to be completed (i.e., processed) on one line before a request on another line can be processed (i.e., "it gets a busy signal"). The CD-writer, printer or other host device may include traditional USB connections to a PC or notebook computer. A hosting device may include a sliding or movable door which provides access to the hosting device's USB cable connector. When the hosting device is connected to the camera, the door closes.

A user does not have to power up a computer or even know how to use a computer (which allows non-computer user an entry to digital photography). The CDs onto which images are downloaded can be plugged into a computer or DVD player. The digital camera may include still camera and video functions and images may have the option of a sound component which could be transferred with an image in separate files (i.e., the camera's processor could download "jpeg" images and accompanying "wav" files (same file name, different file type extension). Additionally, the camera could also transfer a sound component accompanying video.

The hosting device (e.g., a photoprinter) may associate a date and time stamp with an image. The UI of the camera could query the user to provide a caption for an image.

Figure 1B:
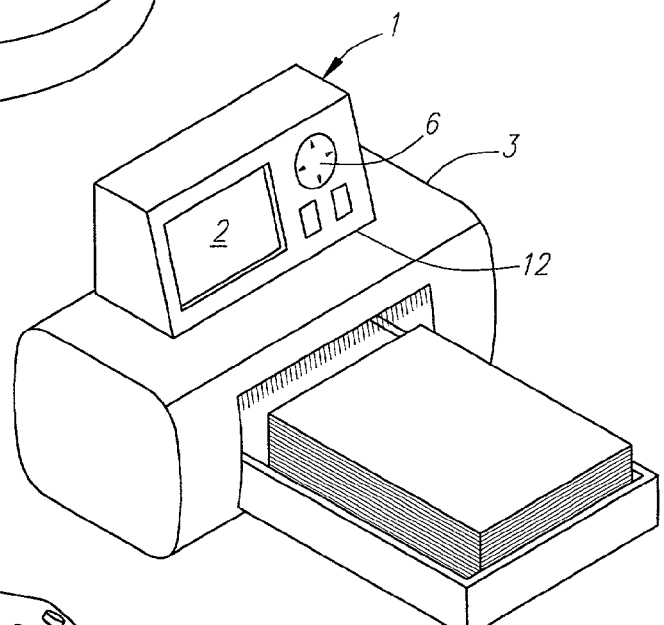
FIG. 1B illustrates an orthogonal view of a digital camera mounted to a Printer.
Figure 2A:
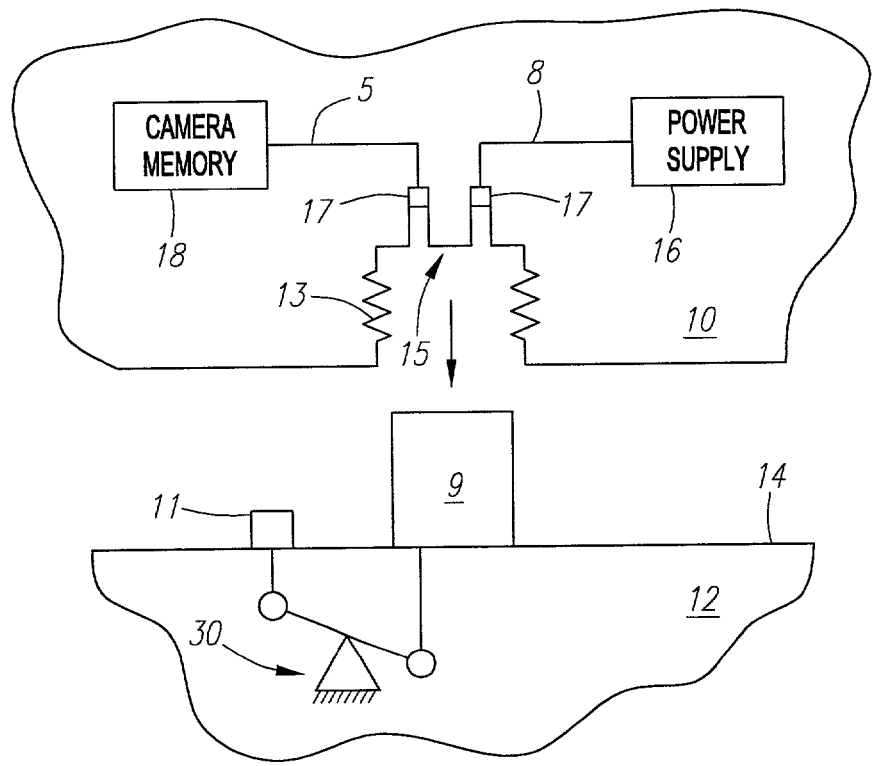
FIG. 2A illustrates a cross-sectional view of a digital camera positioned above a camera mounting surface.
Figure 2B:
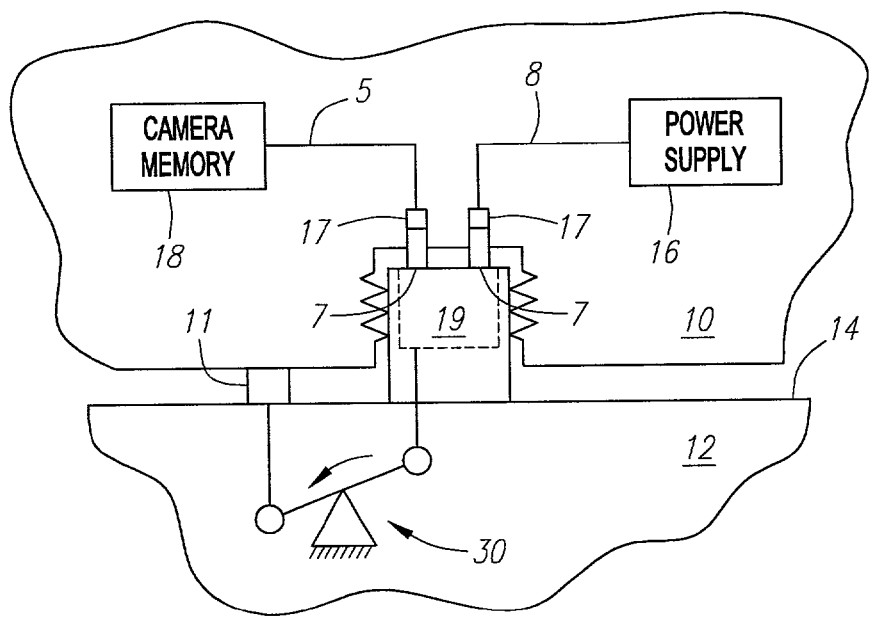
FIG. 2B illustrates a cross-sectional view of a digital camera mounted to the camera mounting surface of FIG. 2A.

In accordance with an embodiment of the invention, FIG. 1A illustrates an orthogonal view of a digital camera 1 mounted to a CD-writer 4 where the LCD-side of camera 1 faces a user. Digital camera 1 includes an image LCD 2 that displays images contained within a camera memory 18 (FIGS. 2A & 2B). LCD 2 functions as the UI for CD Writer 4. In accordance with an embodiment of the invention, FIG. 1B illustrates an orthogonal view of a digital camera 10 mounted to a printer 3 where the LCD-side of camera 1 faces a user. Digital camera 1 includes image LCD 2 which functions as a UI for photoprinter 3.

The UI of camera 1 has the capability to start and stop a slide-show of images stored in the memory of the camera. This slide-show can be configured as the default mode of the camera. However, the camera can be programmed to display the images in any sequence. Camera memory 18 may include a date stamp for every image. Therefore, the memory can be programmed to display images in any desired chronological order. Existing buttons on a digital camera can be used to control the endpoints of the data range for photo display. Existing buttons, such as four-way button 6, also allow a user to fast-forward through the slide-show. Four-way button 6 allows a user to interrupt the default mode so that the user can move through the stored images to a desired image. The trend toward larger LCD displays and touch-screen support further enhances the value of this invention. Digital camera 1 acts as a conventional digital camera prior to docking with the hosting device (e.g., CD-writer 4 or photoprinter 3). When camera 1 is docked, the connection between camera 1 and CD-writer 4 is engaged, notifying the processor of camera 1 that camera 1 is now docked. The processor executes a program stored within the processor, at the time camera 1 docks to the hosting device, which allows camera 1 to function as the UI of the hosting device. The program queries the hosting device to identify what type of device it is. The hosting device provides camera 1 with an identifier which the processor of camera 1 compares against identifiers stored within its memory. Each identifier is associated with a particular UI. When the processor matches the identifier provided by the hosting device to one stored within its memory, the processor then displays a UI appropriate to the hosting device on LCD 2. When camera 1 is undocked, the processor is alerted that the connection between camera 1 and the hosting device is no longer there and camera 10 reverts to its conventional functions.

Camera 1 may mate with the dock of CD-writer 4 or photoprinter 3 in a number of ways, including without limitation snap-fitting and glide-fitting (i.e., mount 12 is molded to the shape of the body of camera 1 so that when camera 1 is snug-fit to mount 12. Camera 1 does not 'snap-fit' into CD-writer 4 or photoprinter 3 so much as camera 1 connects to CD-writer 4 by gravity alone and is guided mechanically. Camera mount 12 is located on the hosting device and is made of plastic which may be colored so as to mimic the color of the casing of digital camera 1 or CD-writer 4. For example, the outer casing of many digital cameras are a dull silvery-steel color. Camera mount 12 may be colored to match the color of the camera's casing in order to blend the mating of camera 1 and camera mount 12 and further the illusion that camera 1 and camera mount 12 are of single piece construction. Camera mount 12 may be molded so as to fit a particular camera or constructed as a universal dock.

Figure 1C:
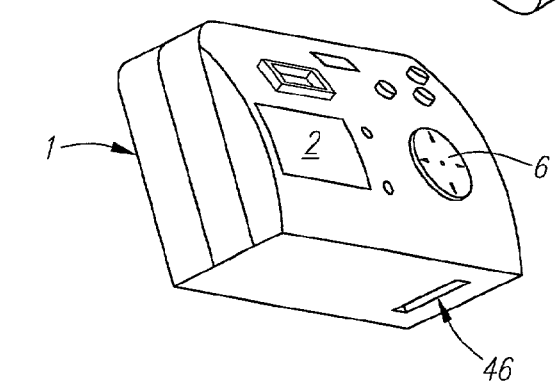
FIG. 1C illustrates an orthogonal view of the camera and a hosting device where a portion of the camera mount of the hosting device is cut-away to reveal the mounting surface of the camera mount.
Figure 1C:
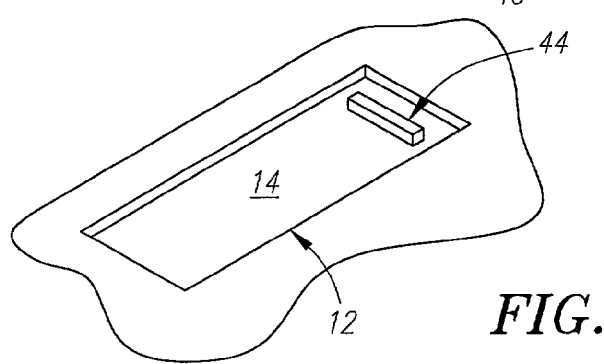

In accordance with an embodiment of the invention, FIG. 1C illustrates the connectors used to mate camera 1 and the hosting device (e.g., CD-writer 4 or photoprinter 3). Power/data cable port 33 (not shown) is connected by cable or wire to camera mount connector 44. The bottom surface of camera 1 has a connector 46 which mates to camera mount connector 44. The pins of each connector mate so as to provide power and data connections between camera 1 and the hosting device. Power/data cable port 33 may be connected to the processor of the hosting device and/or the power supply of the hosting device.

The dock acts as a charger, a data connection, and a mode change (i.e., camera 1 functions as a CD-writer or photoprinter rather than a digital camera). In the alternative, the UI of camera 1 allows the docked camera to display digital images that were downloaded via internet connection from a website where digital images are stored or exchanged peer-to-peer.

The hosting device is not dependent on being connected by cable to a PC, notebook computer or other device. The hosting device may be arranged in a "stand alone" configuration; operationally connected by an RF connection to a PC, or by wireless or wired connection to a cell phone. In accordance with an embodiment of the invention, a hosting device dock provides power for a digital camera and its battery recharge cycle. The hosting device also provides a data connection to transfer images between camera 1 and another device.

In accordance with an embodiment of the invention, a hosting device includes an alternative camera mount 12. FIG. 2A illustrates a digital camera 10 being lowered to an alternative mating surface 14 of camera mount 12. Digital camera 10 includes a power supply 16 for powering camera 10, a memory 18 for storing digital images, and a threaded mounting hole 13. Mounting hole 13 is threaded to allow camera 10 to be able to be mounted to a mounting screw of a conventional camera tripod or other similar mounting surface. A female jack 15 is located on the top surface of hole 13. Jack 15 includes a number of pin contacts 17, in one example four. At least two pin contacts 17 are electrically connected to memory 18 (i.e., the processor of camera 10) via a cable or wire 5. At least two additional pin contacts 17 are electrically connected to power supply 16 via a cable or wire 8. Camera 10 may be powered by a battery source, coupled to an AC source or coupled to the power source of a hosting device such as CD-Writer 4 (FIG. 1A) or photoprinter 3 (FIG. 1B).

Camera mount 12 includes a trigger 11 and a post 9. As seen in FIG. 2B, post 9 further includes male jack 19. Jack 19 includes a number of pins 7, in one example four. Electrical connections (not shown), including but not limited to wires or USB cable, are routed through the center of post 9 between the pins 7 and the memory and/or power source of CD-Writer 4, photoprinter 3 or other hosting device. In the alternative, connections may also be routed to a port on the hosting device that is operationally connected to a PC, notebook computer, personal digital assistant (PDA) or other similar device. Post 9 press-fits snugly into hole 13. Post 9 need not be threaded. Post 9 made be made of hard rubber or rubber-coated metal (including but not limited to rubber-coated steel). At least two pin contacts 17 are electrically connected to memory 18 (i.e., the processor of camera 10) via a cable or wire 5. At least two additional pin contacts 17 are electrically connected to power supply 16 via a cable or wire 8. Camera mount 12 may be powered by a battery source, connected to an AC source or connected to the power source of another device.

Figure 3A:
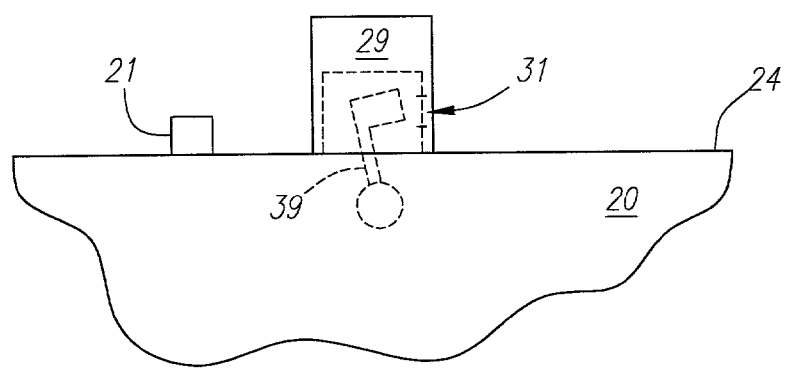
FIG. 3A illustrates a side view of a camera mounting surface.

FIG. 2B illustrates camera 10 mated to surface 14 of camera mount 12. As camera 10 contacts and presses down on trigger 11 (as camera 10 is mated to mount 12), pins 7 extend from post 9 and mate with pin contacts 17. As seen in FIG. 3A, pins 7 are not extended prior to trigger 11 being depressed. Trigger 11 is connected to a mechanical linkage 30 that is connected to jack 19. Depressing trigger 11 exerts force on linkage 30 which is coupled to jack 19 which causes jack 19 to raise within post 9, exposing pins 7 which engage contacts 17. The mating pins 7 and contacts 17 for data are connected to memory 18 through an I/O channel. The mating pins 7 and contacts 17 for power are connected directly to power supply 16.

In an alternative embodiment, a trigger can be implemented in which the camera is guided into alignment with a door located on the flat surface of the camera mount under the camera mounting hole. When the camera is lowered to the surface of the camera mount, the bottom of the camera depresses the trigger. The trigger is connected by a mechanical linkage, similar to the one outlined above, to the door. The door slides open, allowing a combined data/power connector to rise from within the body of the camera mount and protrude from the surface of the camera mount to be inserted into the mounting hole of the camera. The sides of the data/power connector are designed to snap-on the threads inside the camera mounting hole instead of screw-on grip.

In accordance with an embodiment of the invention, a camera dock includes a camera mount 20. FIG. 3A illustrates a side cross-sectional view of another alternative mating surface 24 of camera mount 20 which includes a trigger 21 and a post 29. As seen in FIG. 3A, post 29 is hollow and includes a flag-like electrical contact 39. Electrical contact 39 includes four connections or pins (not shown). Preferably, two pins dedicated to power are electrically connected to a cable or wire 8 connected to a power supply 26 (not shown) and two pins dedicated to data are electrically connected to a cable or wire 2 connected to a memory 28 (i.e., the processor of camera 10) (not shown). The power and data pins are separated by an insulator. Electrical contact 39 functions as a USB connection. Electrical connections, including but not limited to wires or USB cable, are routed through post 29 between the pins of electrical contact 39 and the memory and/or power source of CD-Writer 4, photoprinter 3 or other hosting device. In the alternative, connections may also be routed to a port on the hosting device that is operationally connected to a PC, notebook computer, personal digital assistant (PDA) or other similar device. Post 29 press-fits snugly into hole 13. Trigger 21 is connected to a mechanical linkage 40 that is connected to flag-like contact 39. Depressing trigger 21 causes contact 39 to pivot into position, allowing the front edge of the flag-portion to protrude through a slit 31 in the side of post 29 and engage contact pad 37 in camera 10.

Figure 3B:
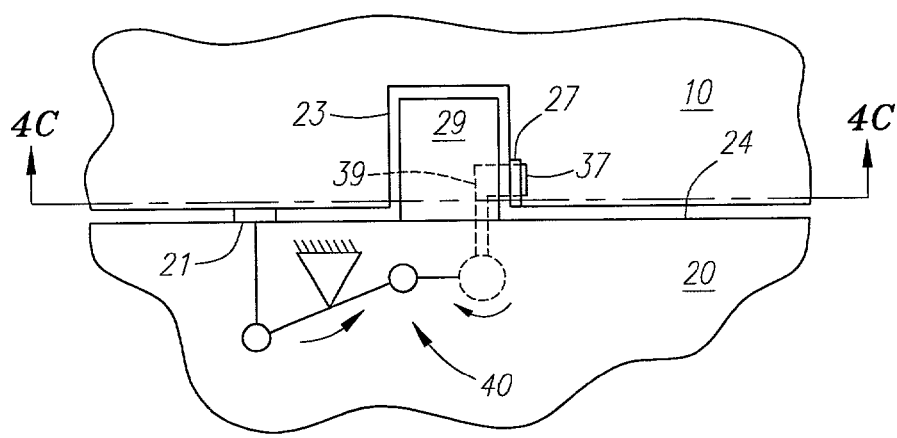
FIG. 3B illustrates a side view of a digital camera mounted to the surface of FIG. 1B.

FIG. 3B illustrates a side view of camera 10 mounted to surface 24 of mount 20. Camera 10 includes a power supply 26 for powering camera 10, a memory 28 for storing digital images, and a threaded mounting hole 23 (threads not shown for clarity). Mounting hole 23 is threaded so as to allow camera 10 to be able to be mounted to the mounting screw of a conventional camera tripod or other similar mounting surface. Camera contact pad 37, located along a slit in the side of hole 23, includes pins 17 that mate to the pins 7 located on electrical contact 39. If the pins 7 on electrical contact 39 are male, the pins 17 located on camera contact pad 37 are female. Contact pad 37 is electrically connected to memory 28 and/or power supply 26. The pins 7, 17 for data are connected to memory 28 through an I/O channel. The pins 7, 17 for power on contact pad 25 are connected directly to power supply 26.

Figure 3C:
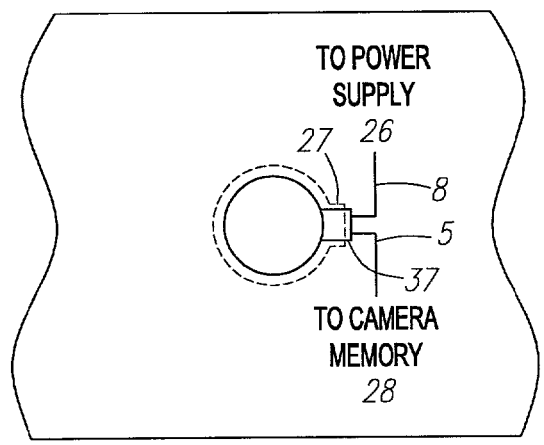
FIG. 3C illustrates a bottom view of a digital camera mounting hole.

FIG. 3C illustrates a bottom view of digital camera mounting hole 23. However, instead of hole 23 being formed with perfect threads, a cut is made in the side of hole 23 to form slot 27. The cut maybe square, triangular, rectangular, or semicircular. FIG. 3C illustrates a rectangular cut, giving hole 23 the shape of a keyhole. Although the present embodiment illustrates a pivoting flag-like contact, a contact slide up slot 27 until the contact electrically connects with pad 37. The data connections are electrically connected to memory 28 (i.e., the processor of camera 10) via a cable or wire 5. The power connections are electrically connected to power supply 26 via a cable or wire 8.

The above-described embodiments of the present invention are illustrative only and not limiting. It will thus be obvious to those skilled in the art that various changes and modifications may be made without departing from this invention in its broader aspects. Therefore, the appended claims encompass all such changes and modifications as falling within the true spirit and scope of this invention.

We claim:

1. A camera mount comprising:
a hosting device including a flat surface for mounting a camera including a user interface;
a hollow post on said flat surface wherein said post is sized to fit within a mounting hole of the camera;
a trigger device for raising and lowering a first connector located within the hollow post wherein said first connector mates with a complementary connector located within the mounting hole of the camera; and
wherein the user interface of the camera also functions as the user interface of the hosting device.

2. The camera mount of claim 1, wherein the first connector is coupled to a power source within said hosting device.

3. The camera mount of claim 1, wherein the first connector is coupled to a memory device within said hosting device.

4. The camera mount of claim 1, wherein the first connector includes pins for data connections to a memory of the camera.

5. The camera mount of claim 1, wherein the first connector includes pins for power connections to a power supply of the camera.

6. The camera mount of claim 1, wherein the first connector is located within said hollow post.

7. The camera mount of claim 1, wherein the trigger device is coupled to a mechanical linkage for raising and lowering the first connector.

8. The camera mount of claim 1, wherein the post press-fits snugly into the mounting hole of the camera.

9. The camera mount of claim 1, wherein the post is threaded.

10. The camera mount of claim 1, wherein the first connector includes a flag-shaped contact for connecting to a memory of the camera.

11. The camera mount of claim 1, wherein the first connector includes a flag-shaped contact for connecting to a power supply of the camera.

12. The camera mount of claim 1, wherein the hosting device is a CD Writer.

13. The camera mount of claim 1, wherein the hosting device is a printer.

14. The camera mount of claim 1, wherein the hosting device is a device that processes digital images.

* * * * *